H. COPELAND.
ANIMAL TRAP.
APPLICATION FILED DEC. 17, 1910.
993,033.
Patented May 23, 1911.
2 SHEETS—SHEET 1.
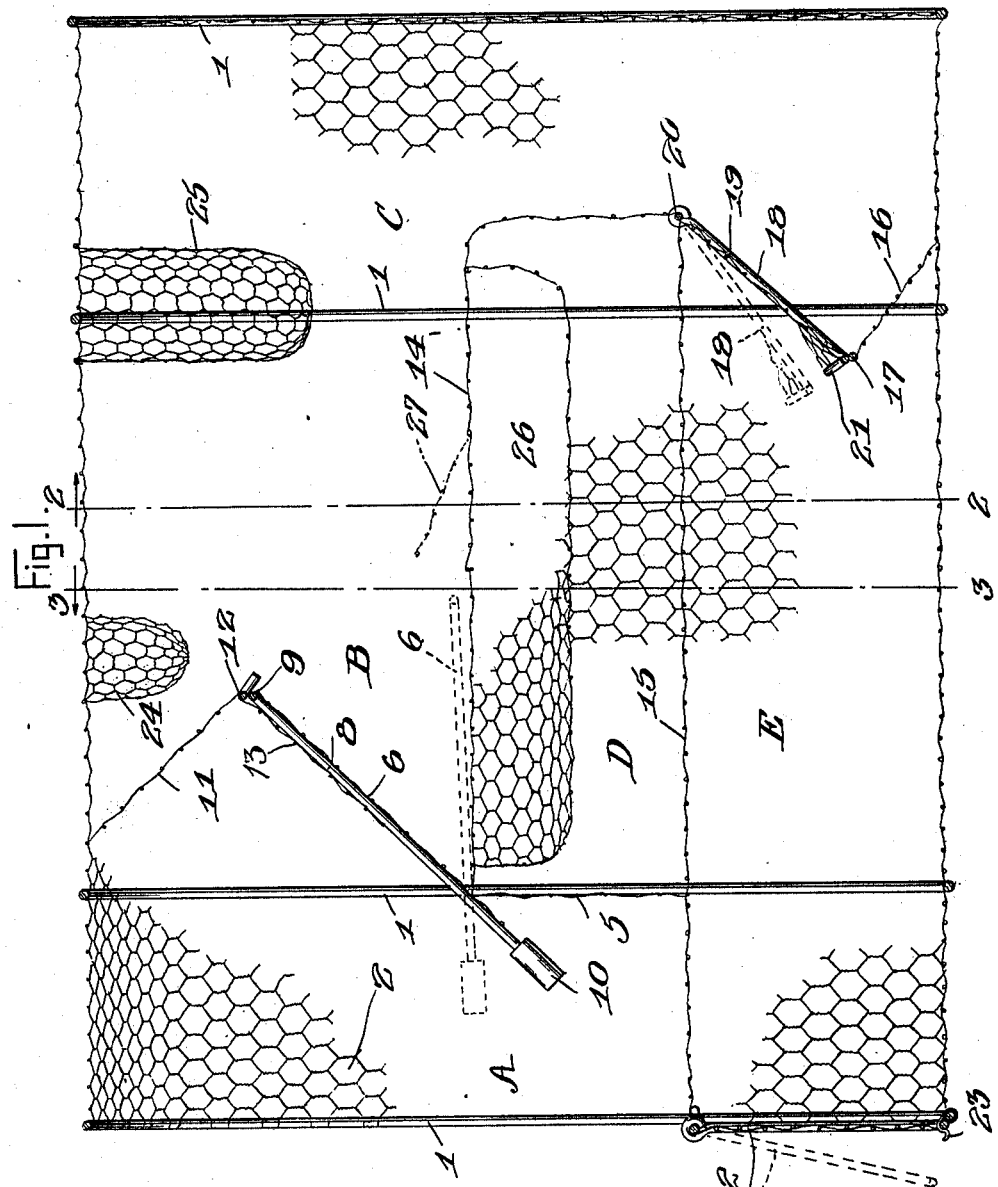

H. COPELAND.
ANIMAL TRAP.
APPLICATION FILED DEC. 17, 1910.
993,033.
Patented May 23, 1911.
2 SHEETS—SHEET 2.
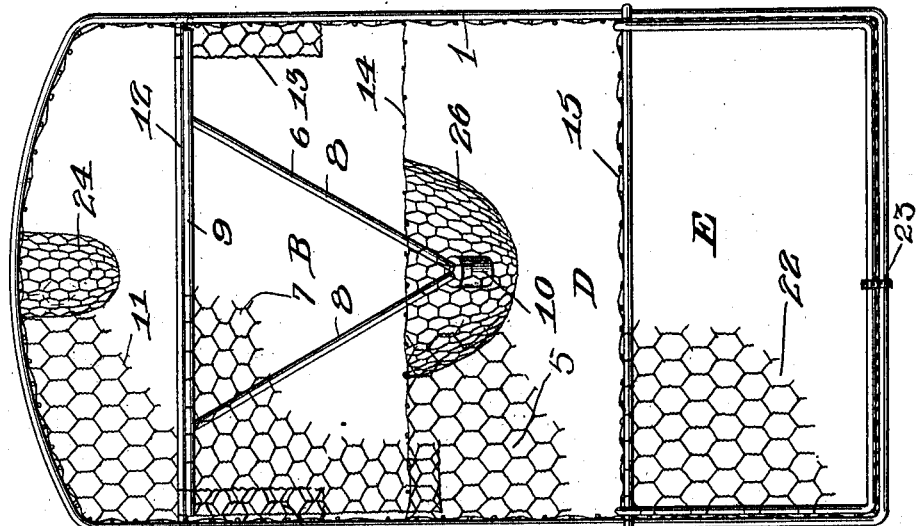
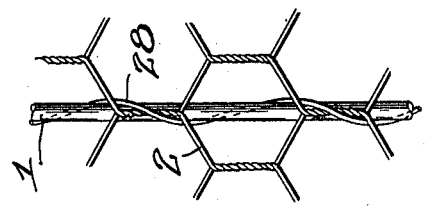
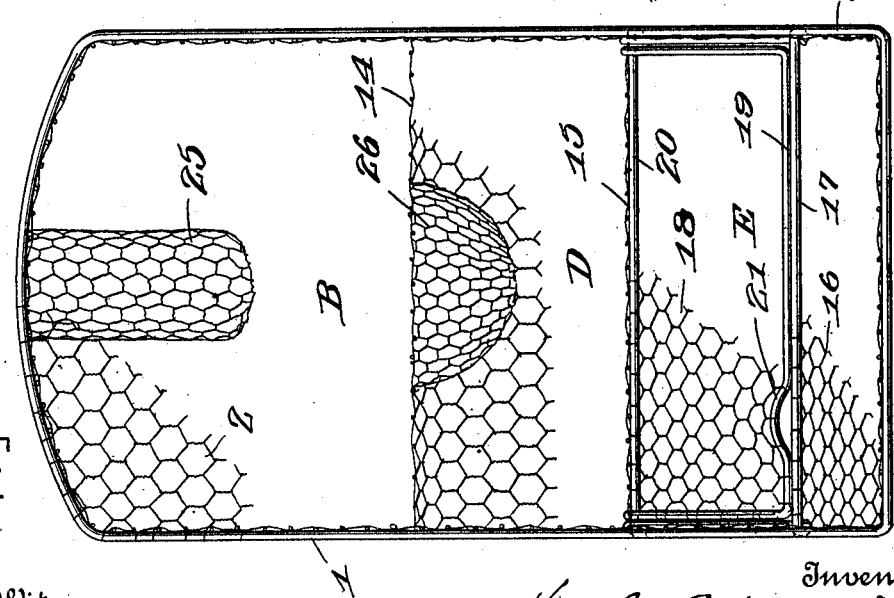

UNITED STATES PATENT OFFICE.

HUGH COPELAND, OF HERTFORD, NORTH CAROLINA.

ANIMAL-TRAP.

993,033. Specification of Letters Patent. Patented May 23, 1911.

Application filed December 17, 1910. Serial No. 597,785.

*To all whom it may concern:*

Be it known that I, HUGH COPELAND, a citizen of the United States, residing at Hertford, in the county of Perquimans and State of North Carolina, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to animal traps, and is designed more particularly for trapping water animals although it is so constructed as to be adapted for trapping water and other animals.

It consists in features of construction and arrangement of parts as hereinafter particularly described so as to entice the animal into the trap and effectively close any way of escape, and after trapping the animal to further entice it into certain compartments of the trap through seeming avenues of escape, thus leaving the trap in condition for entrapping additional animals before removing the previously entrapped animals. To the accomplishment of this and such other objects as may hereinafter appear, the preferred construction is hereinafter particularly described and then sought to be clearly defined by the claims reference being had to the accompanying drawings forming a part hereof and in which:

Figure 1 is a vertical longitudinal section of the trap illustrating the several parts, with portions of the netting constituting part of the trap omitted for the purpose of clearness; Fig. 2 is a vertical cross-section on the line 2—2 of Fig. 1 looking in the direction of the arrow; Fig. 3 is a vertical cross-section on the line 3—3 of Fig. 1 looking in the direction of the arrow; and Fig. 4 is a detail illustrating one manner of securing the wire netting to the frame of the trap.

In the drawings the numeral 1 designates any desired number of metallic hoops or bands, of which four are illustrated, constituting the frame of the trap and to which is secured in any suitable manner the wire netting 2 of any approved type and which constitutes the external walls of the trap, the front end wall of the trap above the lower portion of the trap being left open, or free from the netting, for the free ingress of the animal into the forward portion A of the trap preliminary to entering the centrally disposed compartment B. The compartment B is separated from the forward portion A of the trap by a netting 5 extending across the lower forward end of the compartment B from one side to the other of one of the hoops or bands 1 as illustrated, and by a rearwardly inclined hinged door 6 consisting of a wire netting 7, diagonally disposed rods 8 and an upper transverse rod 9, the lower contiguous ends of the rods 8 being joined one to the other and provided with a weight 10 so as to normally hold the door 6 in an upwardly inclined position as illustrated in Fig. 1 of the drawing, and a downwardly and rearwardly inclined shield or partition 11, preferably of wire netting, extending from the top of the trap and strengthened by a border rod 12, the lower end of said partition lying contiguous to the upper end of the hinged door 6 when the latter is in its normal position.

Extending downwardly and forwardly, toward the front of the trap, at the lower end of the partition 11, and extending inwardly from the sides of the trap, are wings 13 of wire netting and secured to the sides of the trap, so that the door 6 when raised or closed will strike against said side wings and thus be prevented from being moved upwardly away from the lower end of the partition 11.

The compartment B is formed with a bottom 14 preferably made of stiffened wire netting which at its rear end extends into a rear compartment C and thence downwardly and thence forwardly to the hoop or band at the front of the trap so as to form a central compartment D and a lower or bottom compartment E, the horizontally disposed netting constituting the floor 15 to the compartment D and the top of compartment E. This netting 14 will be attached in any suitable manner to the sides of the trap and may be braced or stiffened in any appropriate manner to afford strength and stability. The entrance from the compartment C into compartment E is controlled by an upwardly and forwardly inclined wire netting partition 16 secured in any suitable manner to the walls of the trap and provided at its upper end with a horizontally extending brace rod 17, and by a forwardly and downwardly inclined hinged door 18, which is formed of netting and braced by the border rod 19, the upper ends of the side members thereof being hooked or looped over a horizontally extending rod 20 so as to hinge the door from said rod. In its normal position the door 18 rests at its lower end against the upper end of the partition 16 and is capable of being raised as indicated by dotted lines in Fig. 1 so as to permit an animal to pass from the compartment C into the compartment E, and then to drop by gravity and bear at its lower end against the upper end of the partition 16 so as to effectively close the door against being opened in the opposite direction. The lower portion of the border rod 19 is formed with an upwardly curved portion 21 so as to form a small opening as illustrated which will suggest to an animal in the compartment C an avenue of escape and thus entice it into the bottom compartment E by way of the door 18. The forward end of the compartment E is closed by a hinged door 22 which will be held normally closed by a clip or hook 23, or otherwise, which when raised will permit the door to be swung open for the purpose of removing the animal or animals entrapped in the compartment E.

From the top of the compartment B adjacent to the inclined wall 11, there is suitably sustained a bait receptacle 24, the bait in which will entice an animal entering the front of the trap so that in his effort to reach the bait the animal will step upon the inclined hinged door 6 which will drop to the position indicated by dotted lines in Fig. 1 so that the animal will pass into the compartment B, whereupon the door will swing to its closed position by reason of its weighted lower end. At the rear of the compartment B, next to the compartment C, there is suspended in any suitable way from the top of the trap another bait receptacle 25, the bait in which will entice the animal toward the compartment C at the rear of the compartment B, and the animal finding himself entrapped will then pass down into the compartment C in his endeavor to escape. Upon reaching the bottom of compartment C, and observing the opening in the lower part of the door 18, the animal passes from the compartment C into the compartment E in its effort to escape, lifting the door 18 which immediately drops to its closed position after the animal has passed the same, and thus the animal is entrapped in the compartment E and prevented from returning back into compartment C by closure of the door, and leaving the parts of the trap in operative condition for entrapping another animal which follows the same passageway and finally reaches the compartment E where it is entrapped with the other animal.

Within the centrally disposed compartment D at the upper portion thereof, is positioned a third bait trap 26, which preferably extends the entire length of the floor 14, beneath the same, and the bait in this trap tends to entice the animal from the bottom of the compartment C into the compartment E. This bait receptacle 26 is baited through a door 27 formed in the bottom 14 of the compartment B, said door being hinged and dropping and resting by gravity upon portions of the floor 14 when closed.

When the trap is used for entrapping water animals such as mink and musk rats, it is set in the water so that the bottom 15 of the compartment D will be submerged, and as water animals when trapped make for the water, the animal which passes through the compartment B is attracted by the water beneath the compartment D and to reach the same passes from compartment B into compartment C and thence passes through the door 18 into compartment E where it is finally entrapped. When the trap is set in water for entrapping water animals it is not necessary to bait the bait receptacle 26 in compartment D, as the bait in the other receptacles will attract the animal which when finding itself entrapped makes for the water to find an escape and is entrapped as described, but when used for baiting land animals it is preferred to bait the holder 26 as well as 24 and 25 as greater temptation is afforded the animal so as to induce it to pursue its course until it finally enters the compartment E.

The wire netting may be secured to the several metallic hoops or bands, and also to the brace border rods, by means of a wire 28 entwined around the rods or hoops and around strands of the wire netting as illustrated more clearly in detail in Fig. 4 of the drawing.

It will be understood that the bait holders 24 and 25 may be suspended from the top of the trap by means of hooks or otherwise so as to be easily removed for taking out stale bait and supplying fresh bait, but as such feature is a common expedient and forms no part of the invention it is not necessary to illustrate the same in detail.

I have illustrated with particularity the details of the special features constituting the invention but it is obvious that changes can be made in details of the various parts without departing from the essential features of the invention as the same are indicated in the appended claims.

Having described my invention and set forth its merits what I claim is:

1. An animal trap comprising a cage formed with an upper compartment, a lower compartment, an end compartment at the rear of the upper and the lower compartments, an upwardly inclined tiltable door located at the front of the upper compartment, and a forwardly and downwardly inclined hinged door located between the lower compartment and the lower portion of the end compartment, substantially as described.

2. An animal trap comprising a cage formed with an upper compartment, a lower compartment, an end compartment at the rear of the upper and the lower compartments, a downwardly and rearwardly extending partition at the forward end of the upper compartment, an upwardly and rearwardly inclined tiltable door coöperating with said inclined partition to close the forward end of the upper compartment, a forwardly and upwardly inclined partition positioned at the contiguous portions of the lower and end compartments, and a forwardly and downwardly inclined hinged door at the junction of the lower and the end compartments and coöperating with said inclined partition to control access from the end compartment into the lower compartment, substantially as described.

3. An animal trap comprising a cage formed with an upper compartment, a lower compartment, a compartment between the upper and lower compartments, an end compartment in communication with the upper and the lower compartments, an upwardly inclined tiltable door at the forward end of the upper compartment, a forwardly and downwardly inclined hinged door between the lower and the end compartments, and a bait holder in the upper portion of the compartment between the upper and lower compartments, substantially as described.

4. An animal trap comprising a cage formed with an upper compartment, a lower compartment, a compartment between the upper and lower compartments, an end compartment in communication with the rear of the upper and the lower compartments, an inclined tiltable door at the front of the upper compartment, a downwardly inclined hinged door controlling communication between the end and the lower compartments, a bait holder located in the upper compartment toward its forward end, a bait holder located at the rear of the upper compartment next to the end compartment, and a bait holder located in the upper portion of the compartment between the upper and lower compartments, substantially as described.

In testimony whereof I affix my signature in presence of two witnesses.

HUGH COPELAND.

Witnesses:
R. McMULLAN,
J. L. TUCKER.

Copies of this patent may be obtained for five cents each, by addressing the "Commissioner of Patents, Washington, D. C."